US008949595B2

(12) United States Patent
Kwon et al.

(10) Patent No.: US 8,949,595 B2
(45) Date of Patent: Feb. 3, 2015

(54) MUTUAL AUTHENTICATION APPARATUS AND METHOD IN DOWNLOADABLE CONDITIONAL ACCESS SYSTEM

(75) Inventors: Eun Jung Kwon, Daejeon (KR); Han Seung Koo, Daejeon (KR); Soon Choul Kim, Daejeon (KR); Heejeong Kim, Daejeon (KR); Young Ho Jeong, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 855 days.

(21) Appl. No.: 12/643,054

(22) Filed: Dec. 21, 2009

(65) Prior Publication Data

US 2010/0161966 A1 Jun. 24, 2010

(30) Foreign Application Priority Data

Dec. 22, 2008 (KR) .................. 10-2008-0131455

(51) Int. Cl.
*H04L 29/06* (2006.01)
*H04L 9/32* (2006.01)
*H04L 9/08* (2006.01)

(52) U.S. Cl.
CPC ........... *H04L 9/3273* (2013.01); *H04L 2209/56* (2013.01); *H04L 63/166* (2013.01); *H04L 2209/603* (2013.01); *H04L 63/123* (2013.01); *H04L 63/0869* (2013.01); *H04L 9/321* (2013.01); *H04L 9/083* (2013.01); *H04L 9/0877* (2013.01); *H04L 63/0442* (2013.01)
USPC ........................................................ 713/155

(58) Field of Classification Search
USPC .......................................................... 713/155
See application file for complete search history.

(56) References Cited

U.S. PATENT DOCUMENTS

| | | | |
|---|---|---|---|
| 2005/0152551 | A1 | 7/2005 | Defreese et al. |
| 2007/0143812 | A1 | 6/2007 | Choi |
| 2007/0143862 | A1* | 6/2007 | Kim ................................ 726/31 |
| 2008/0098212 | A1* | 4/2008 | Helms et al. .................. 713/155 |
| 2008/0177998 | A1* | 7/2008 | Apsangi et al. ............... 713/155 |

FOREIGN PATENT DOCUMENTS

| | | |
|---|---|---|
| KR | 1020060122534 A | 11/2006 |
| KR | 1020070064871 A | 6/2007 |
| KR | 1020070064891 A | 6/2007 |

* cited by examiner

*Primary Examiner* — Esther Benoit
(74) *Attorney, Agent, or Firm* — Ladas & Parry LLP

(57) ABSTRACT

A mutual authentication method in a Downloadable Conditional Access System (DCAS) is provided. The mutual authentication method may receive authentication-related information about authentication between an authentication unit and a security module (SM) from a Trusted Authority (TA), generate an authentication session key using the authentication-related information, transmit the authentication session key by the authentication unit to the SM through a Cable Modem Termination System (CMTS), and control a Conditional Access System (CAS) software to be downloaded to the SM from the authentication unit, when the authentication is completed by the authentication session key.

6 Claims, 5 Drawing Sheets

MUTUAL AUTHENTICATION APPARATUS AND METHOD IN DOWNLOADABLE CONDITIONAL ACCESS SYSTEM

CROSS-REFERENCE TO RELATED APPLICATION

This application claims priority from Korean Patent Application No. 10-2008-0131455, filed on Dec. 22, 2008, in the Korean Intellectual Property Office, the entire disclosure of which is incorporated herein by reference.

BACKGROUND OF THE INVENTION

1. Field of the Invention

The present invention relates to a mutual authentication apparatus and method in a Downloadable Conditional Access System (DCAS), and more particularly, to a mutual authentication apparatus and method in a DCAS which may provide an authentication protocol having a variety of security functions, such as a message authentication, a device authentication, and an encryption or decryption of traffic data generated, when a Conditional Access System (CAS) software is transmitted.

2. Description of Related Art

Currently, a digital cable broadcasting system generally uses a cable card such as a Personal Computer Memory Card International Association (PCMCIA) or a smart card depending on an application of a Conditional Access (CA) technology, to provide a fee-based broadcasting service.

However, a CAS software (or CAS client image) may be distributed off-line through a smart card or a PCMCIA card. Accordingly, when a problem occurs in a CAS, a predetermined time may be spent in reissuing a card, and an additional cost may be required due to the reissuance of the card.

Currently, a Downloadable Conditional Access System (DCAS) based on an interactive cable network is developed to overcome such disadvantages. In DCAS, a security module where a CAS software is installed may be mounted in a set-top box, and a security module program including the CAS software may be easily updated through an interactive cable network, when an error occurs in the security module program or when a version update of the security module program is required.

However, mutual authentication between an authentication unit and a security module mounted in a set-top box is to be performed to develop a DCAS. Also, when a security module mounted in a set-top box does not authenticate an authentication unit located in a headend, the security module may be attacked by a third server masquerading as the authentication unit.

Accordingly, an efficient mutual authentication method is required to overcome such security problems in a DCAS.

SUMMARY OF THE INVENTION

According to an aspect of the present invention, there is provided a mutual authentication apparatus in a Downloadable Conditional Access System (DCAS), the mutual authentication apparatus including: an authentication unit to transmit an authentication session key to a security module (SM) through a Cable Modem Termination System (CMTS); a key management unit to generate and manage the authentication session key; and a download unit to control the SM to download or update a Conditional Access System (CAS) software.

Also, the SM may download the CAS software from the authentication unit and obtain an authority to a broadcasting signal. A Trusted Authority (TA) may provide authentication-related information about authentication between the authentication unit and the SM.

According to an aspect of the present invention, there is provided a mutual authentication method in a DCAS, the mutual authentication method including: receiving authentication-related information about authentication between an authentication unit and an SM from a TA; generating an authentication session key using the authentication-related information; transmitting the authentication session key by the authentication unit to the SM through a CMTS; and controlling a CAS software to be downloaded to the SM from the authentication unit, when the authentication is completed by the authentication session key.

According to another aspect of the present invention, there is provided a mutual authentication method in a DCAS, the mutual authentication method including: periodically signing software client-related information using a private key of an authentication unit, and transmitting the software client-related information to an SM; encrypting a first message by the SM, and receiving the encrypted first message, the first message including session identification information (session_ID), an SM certificate (SM_Certificate), and host identification information (Key_Pairing_ID); performing digital signature verification and decryption of the encrypted first message, and transmitting a second message to a TA, the second message being generated by digitally signing and encrypting the decrypted first message; performing digital signature verification and decryption of the second message by the TA, digitally signing a third message, outputted using the decrypted second message, using a private key of the TA, and receiving the third message encrypted by applying a Secure Sockets Layer (SSL) scheme using a public key of the TA; performing digital signature verification and decryption of the encrypted third message, configuring a fourth message, digitally signing and encrypting the fourth message, and transmitting the encrypted fourth message to the SM, the fourth message being configured by combining the session identification information, the session generation information, and validity verification information from the decrypted third message; performing digital signature verification and decryption of the encrypted fourth message by the SM, and receiving a fifth message from the decrypted fourth message, the fifth message including a first session key, the session identification information, a secret key (Ki), and the session generation information, and the first session key being generated by any one of the third messages and a first SM identification number (NONCE_SM); performing digital signature verification and decryption of the encrypted fifth message, and generating a second session key using information included in the decrypted fifth message, the first SM identification number, and information included in the third message with respect to same session identification information; determining whether the second session key is identical to the first session key; generating an initial vector (IV), and encrypting a second SM identification number (NONCE_SM+1) using the IV and the second session key based on an encryption scheme using the public key of the TA, the second SM identification number being obtained by increasing the first SM identification number; and encrypting a sixth message using a public key of the SM, and digitally signing the encrypted sixth message and the first SM identification number using the private key of the authentication unit, the sixth message including the session identification information, the second SM identification number, and the IV.

Also, the mutual authentication method may further include: performing digital signature verification and decryption, by the SM, of the fifth message and the sixth message, and decrypting any one of the encrypted third messages based on the SSL scheme using the IV and the first session key received in the decrypted fifth message and sixth message; configuring, by the SM, status identification information including the session identification information and status information about whether the first session key is identical to the second session key; and digitally signing and encrypting, by the SM, the status identification information, and transmitting the encrypted status identification information to the authentication unit.

Also, the mutual authentication method may further include: performing digital signature verification and decryption of the status identification information, and when a message received with respect to the session identification information is successfully processed, configuring a seventh message including message process success information and installment operation control information; receiving the seventh message digitally signed and encrypted by the SM; controlling the SM to receive an SM client image from a server using the message process success information and an SM client transmission mechanism (TM) defined in the seventh message, the server storing the SM client image encrypted using thet session key; digitally signing and encrypting the status information (Download_Status) associated with download and installment of the SM client image, and configuring an eighth message; receiving the eighth message digitally signed and encrypted by the SM; and configuring, by the SM, a ninth message using Impulse Pay Per View (IPPV) purchase information about purchase request information of the seventh message (PurchaseReport_REQ), and receiving the ninth message.

According to an aspect of the present invention, there is provided a key generation method for mutual authentication in a DCAS, the key generation method including: receiving an initial key seed value (Kc) and a random value (RAND_TA) required for generation of a session key through a TA, the initial key seed value being generated by inputting a secret key (pre-shared key) previously shared by an SM and the TA; receiving first information including a unique number (SM_ID) of the SM received from the SM, the initial key seed value (Kc), the random value (RAND_TA) randomly generated by the SM, hardware version information of the SM, and software version information of the SM; processing the first information using a hash function; defining second information, processed by the hash function, as a master key; processing the second information using a random function; and selecting a predetermined bit from the second information, processed by the random function, and defining the selected bit as the session key shared by the SM and an authentication unit.

According to the present invention, an encryption may be performed by a public key of a receiving end after the digital signing may be performed by a private key of a transmission end. Also, a decryption may be performed by a private key of the receiving end after the digital signature verification may be performed by a public key of the transmission end.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
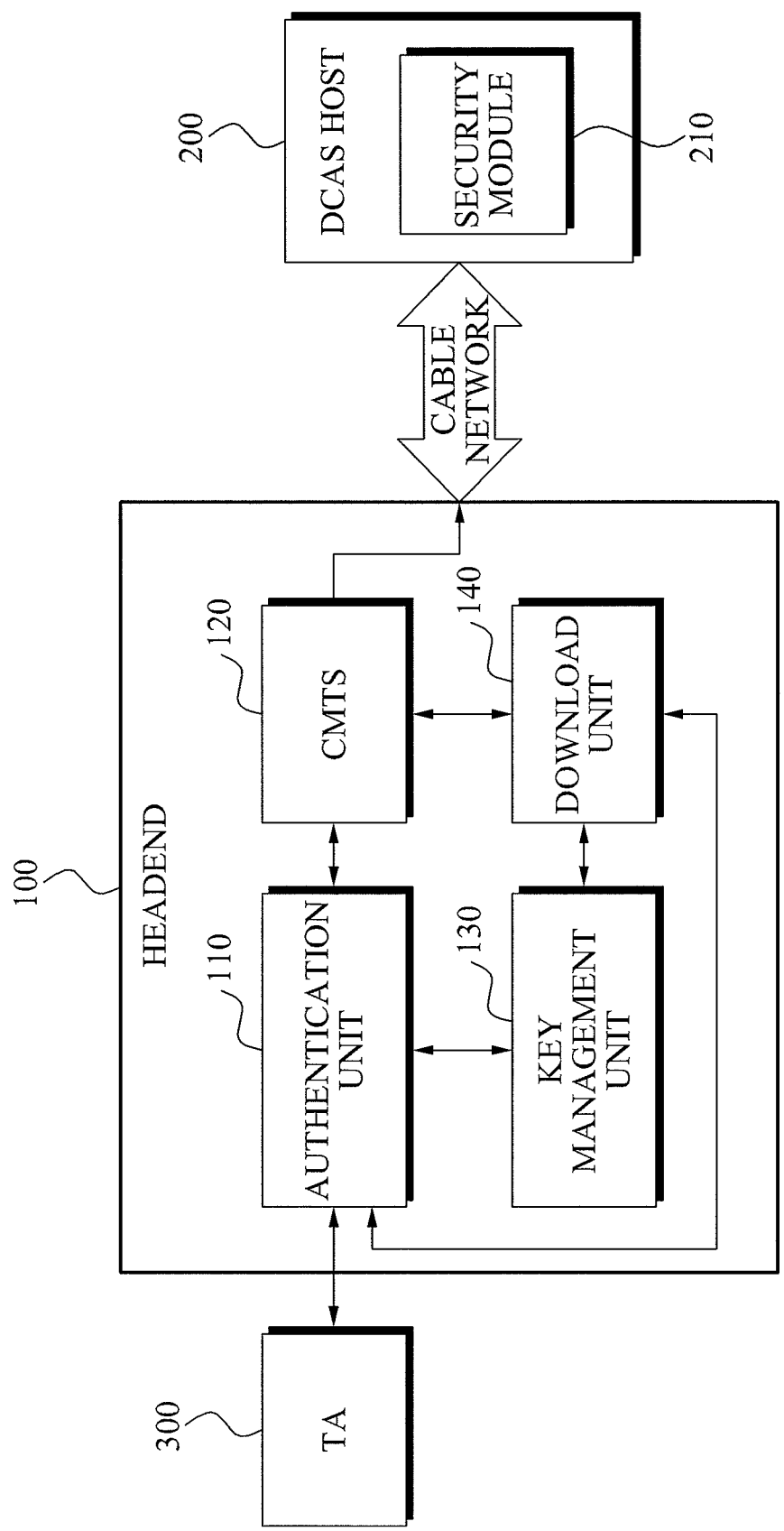
FIG. 1 is a block diagram illustrating a configuration of a mutual authentication apparatus in a Downloadable Conditional Access System (DCAS) according to an embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures. When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

FIG. 1 is a block diagram illustrating a configuration of a mutual authentication apparatus in a Downloadable Conditional Access System (DCAS) according to an embodiment of the present invention.

As illustrated in FIG. 1, an authentication unit 110 of a headend 100 may interactively communicate with a security module (SM) 210 of a DCAS host 200 via a cable network.

In this instance, the authentication unit 110 and the SM 210 may use a third-party trusted authority (TA) 300 as opposed to a cable broadcasting provider to manage information for authentication. The TA 300 may securely communicate with the authentication unit 110 and provide various information for authentication.

The authentication unit 110 may transmit session key generation information to the SM 210 through a Cable Modem Termination System (CMTS) 120. The session key generation information used for authentication may be transmitted from the TA 300.

Also, the TA 300 may provide authentication-related information about authentication between the authentication unit 110 and the SM 210.

When the authentication is completed by an authentication session key, the SM 210 may download Conditional Access System (CAS) software from the authentication unit 110 and obtain an authority for a broadcasting signal.

That is, the SM 210 downloading or updating the CAS software may obtain viewing entitlement with respect to a scrambled and transmitted broadcasting signal, and may provide a subscriber with a fee-based broadcasting service through Customer Premise Equipment (CPE).

In this instance, a key management unit 130 may generate and manage the authentication session key. A download unit 140 may control the SM 210 to download or update the CAS software.

The mutual authentication apparatus may perform a security and authentication process of information transmitting/receiving among the TA 300, the authentication unit 110, and the SM 210 according to a DCAS protocol. The DCAS protocol may define a communication mechanism associated with a standard and a process of the information transmitting/receiving among the TA 300, the authentication unit 110, and the SM 210.

Figure 2:
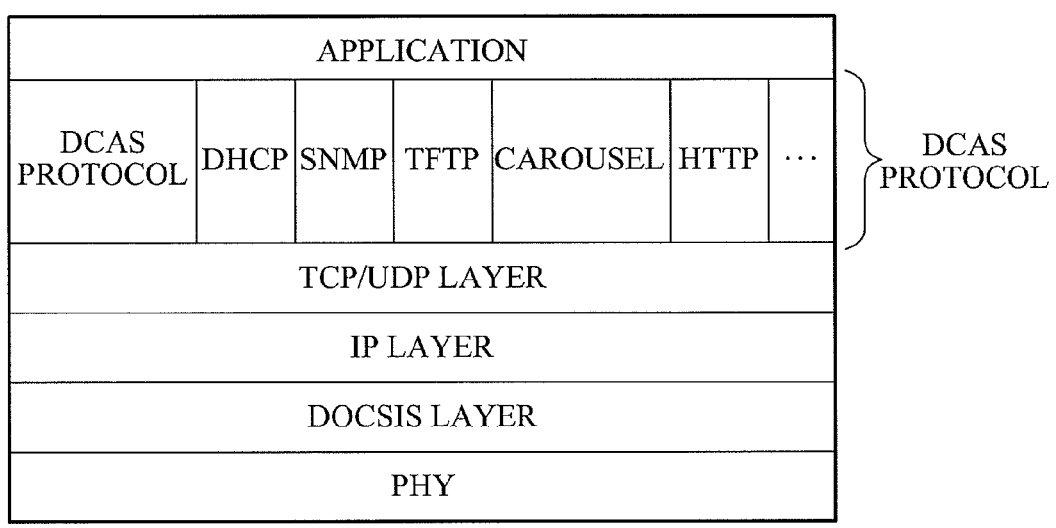
FIG. 2 is a diagram illustrating an example of a configuration of a DCAS protocol according to an embodiment of the present invention.

FIG. 2 is a diagram illustrating an example of a configuration of a DCAS protocol according to an embodiment of the present invention.

As illustrated in FIG. 2, the DCAS protocol may be defined to be operated independently of a Data Over Cable Service Interface Specification (DOCSIS) layer, an Internet Protocol (IP) layer, a Transmission Control Protocol/User Datagram Protocol (TCP/UDP) layer. Also, the DCAS protocol may perform mutual authentication between an authentication unit 110 and an SM 210 to enable the CAS software to be transmitted to the SM.

As described above, a mutual authentication apparatus in a DCAS may perform mutual authentication between the authentication unit 110 and the SM 210 based on the DCAS protocol, which is described in detail with reference to FIG. 3.

Also, in the mutual authentication apparatus, the authentication unit 110 and the SM 210 may share information for message processing defined in the DCAS protocol.

That is, the SM 210 may include, in advance, a certificate of a TA 300, a certificate of the SM 210, a private key of the SM 210, and a Random Number Generator (RNG) to perform a DCAS authentication protocol.

Also, the authentication unit 110 may include, in advance, the certificate of the TA 300, a certificate of the authentication unit 110, a private key of the authentication unit 110, and RNG.

Figure 3:
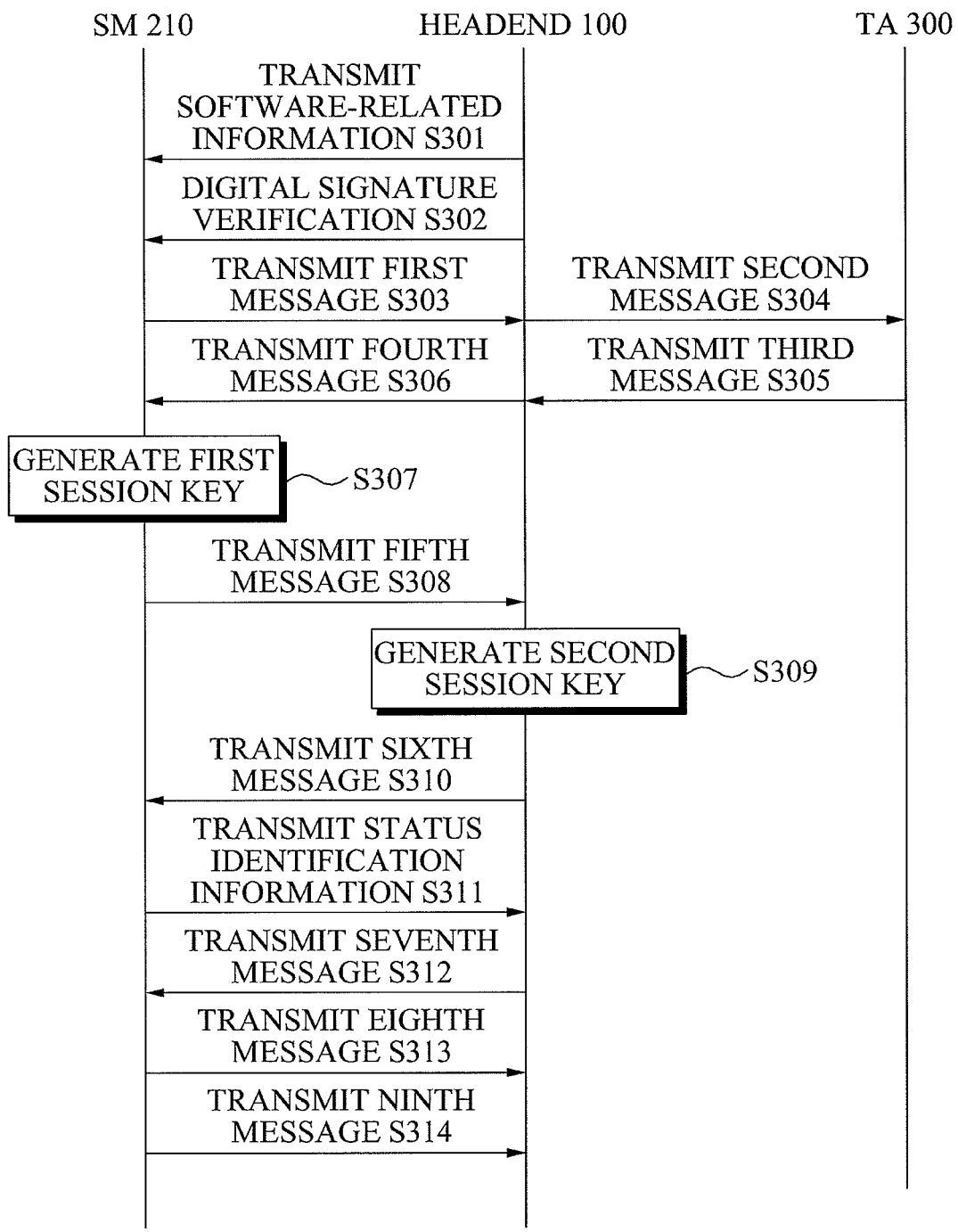
FIG. 3 is a flowchart illustrating a mutual authentication method in a DCAS according to an embodiment of the present invention.

FIG. 3 is a flowchart illustrating a mutual authentication method in a DCAS according to an embodiment of the present invention.

In operation S301, the authentication unit 110 may periodically sign software client-related information using a private key of the authentication unit 110, and transmit the software client-related information to the SM 210.

In this instance, the software client-related information may include software client version information and identification information of the authentication unit 110. The software client version information may include information about a hardware version (HW_Version) and a bootloader software version (SW_Version) of the SM 210, and a software client version (SM_ClientVersion) including at least one of a certificate (AP_Certificate), a CAS, a Digital Rights Management (DRM), and an Authorized Service Domain (ASD) of an SM chip.

In operation S302, the SM 210 may receive certificate information of the authentication unit 110, extract a public key of the authentication unit 110 from the received message (*software client-related information, and verify a digital signature of the received message using the extracted public key.

Also, the SM 210 may compare SM client version information, installed in the SM 210, with another SM client version information, defined in the received message, of the SM 210. When a message about an upper version is received, the SM 210 may encrypt information excluding an SM certificate of a first message using the public key of the authentication unit 110, and transmit the encrypted information to the authentication unit 110.

Also, in operation S302, the authentication unit 110 may digitally sign a message using the private key of the authentication unit 110, and transmit the message to SM 210. The message may include schedule information (Download-Schedule) which is update management information of an SM client, key request information (KeyRequest_REQ) enabling the SM 210 to perform session key regeneration, or purchase request information (PurchaseReport_REQ) of an Impulse Pay Per View (IPPV) stored in the SM 210.

In operation S303, the SM 210 may configure a first message, encrypt information excluding the SM certificate of the first message, and transmit the encrypted information to the authentication unit 110. The first message may include session identification information (session_ID), an SM certificate (SM_Certificate), and host identification information (Key_Pairing_ID).

Figure 4:
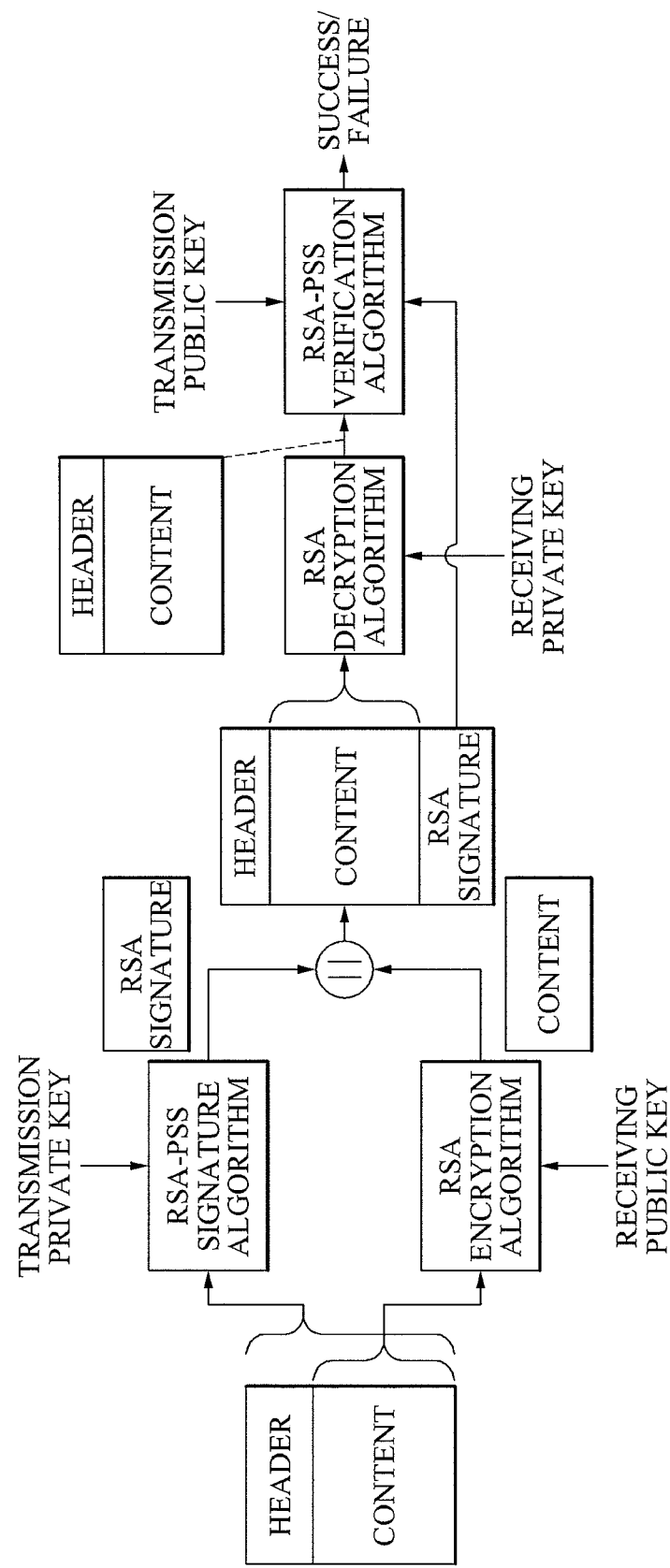
FIG. 4 is a diagram illustrating an example of a message signing and encryption operation according to an embodiment of the present invention.

FIG. 4 is a diagram illustrating an example of a message signing and encryption operation according to an embodiment of the present invention.

As illustrated in FIG. 4, the SM 210 may encrypt the information excluding the SM certificate of the first message using the public key of the authentication unit 110, transmit the encrypted information to the authentication unit 110, and encrypt the host identification information using a public key of the TA 300. Also, the SM 210 may digitally sign the session identification information, the SM certificate, and the encrypted host identification information using a private key of the SM 210.

According to an embodiment of the present invention, the encryption may be performed by a public key of a receiving end after the digital signing may be performed by a private key of a transmission end. Also, a decryption may be performed by a private key of the receiving end after the digital signature verification may be performed by a public key of the transmission end.

In operation S304, the authentication unit 110 may decrypt the encrypted first message using the private key of the authentication unit 110, and transmit a second message to the TA 300. The second message may be generated by digitally signing the decrypted first message using the private key of the authentication unit 110 and encrypting the decrypted first message using the public key of the TA 300.

In this instance, the authentication unit 110 may receive the certificate information of the SM 210, and perform digital signature verification using a public key of the SM 210. The public key of the SM 210 may be included in the certificate information of the SM 210.

An Advanced Encryption Standard 256 Cipher Block Chaining (AES-256 CBC) mode may be applied when encrypting or decrypting using the public key of the TA 300, and thus a Secure Sockets Layer (SSL) may be applied to encryption or decryption.

In operation S305, the TA 300 may perform digital signature verification of the second message using the public key of the authentication unit 110, and decrypt the second message using the private key of the authentication unit 110. Also, in operation S305, the TA 300 may digitally sign a third message, outputted using the decrypted second message, using a private key of the TA 300, encrypt the third message using the public key of the TA 300, and transmit the third message to the authentication unit 110.

In this instance, the third message, outputted using the decrypted second message, may include a validity verification result value (Auth_Rst) about the host identification information (Key_Pairing_ID) of the SM 210, at least one random value (RAND_TA) required for generation of a session key shared by the authentication unit 110 and the SM 210, at least one initial key seed value (Kc) generated by inputting a secret key (Ki) shared by the SM 210 and the TA 300, at least one signed response (SRES) value, a Key Pairing Key (KPK), and a Rivest-Shamir-Adelman (RSA) digital signature value (SIGNKPK) of the KPK. Also, the TA 300 may encrypt the third message using the public key of the TA 300 by applying the SSL scheme to the third message, and transmit the encrypted third message to the authentication unit 110.

In operation S306, the authentication unit 110 may decrypt the encrypted third message using the public key of the TA 300, digitally sign the decrypted third message using the public key of the authentication unit 110, and decrypt the digitally signed third message using the private key of the authentication unit 110.

Also, the authentication unit 110 may configure a fourth message by combining the session identification information, the session generation information, and validity verification information from the decrypted third message. The session generation information may include the random value to generate the session key in the SM 210. The validity verification information may include the validity verification result value, the KPK to verify the validity of the host identification information (Key Pairing ID), and the SIGNKPK of the KPK.

In operation S306, the authentication unit 110 may digitally sign the fourth message using the private key of the authentication unit 110, encrypt the fourth message using the public key of the SM 210, and transmit the encrypted fourth message to the SM 210.

In operation S307, the SM 210 may perform digital signature verification of the encrypted fourth message using the public key of the authentication unit 110, decrypt the fourth message using the private key of the SM 210, and generate a first session key. Any one of the third messages and a first SM identification number (NONCE_SM) may be generated. In this instance, any one of the third messages, for example, may be three random values (RAND_TAs), three initial key seed values (Kcs) and a signed response (SRES) value generated through the secret key (Ki) previously stored in the SM 210. The first session key may be generated by referring to the hardware version (HW_Version) value, the software version (SW_Version) value, the SM identification information, and the like.

In operation S308, the SM 210 may digitally sign a fifth message using the private key of the SM 210, encrypt the fifth message using the public key of the authentication unit 110, and transmit the encrypted fifth message to the authentication unit 110. The fifth message may include the first session key, the session identification information, the secret key (Ki), the session generation information, the hardware version (HW_Version) information, and the software version (SW_Version) information.

In operation S309, the authentication unit 110 may perform digital signature verification and decryption of the encrypted fifth message, and generate a second session key using information included in the decrypted fifth message, and information included in the third message with respect to identical session identification information. For example, the information included in the decrypted fifth message may be the first SM identification number (NONCE_SM), unique number (SM_ID), the hardware version (HW_Version) information, and the software version (SW_Version) information.

The authentication unit 110 may determine whether the second session key is identical to the first session key.

The authentication unit 110 may generate an initial vector (IV), and encrypt a second SM identification number (NONCE_SM+1) using the IV and the second session key based on an encryption scheme using the public key of the TA 300. For example, the second SM identification number may be obtained by adding one to the first SM identification number.

In operation S310, the authentication unit 110 may encrypt a sixth message using the public key of the SM 210, and digitally sign the encrypted sixth message and the first SM identification number (NONCE_SM) using the private key of the authentication unit 110. The sixth message may include the session identification information, the second SM identification number, and the IV.

The SM 210 may decrypt the fifth message and the sixth message using the private key of the SM 210, and perform digital signature verification using the public key of the authentication unit 110.

That is, when the decrypted second SM identification number is identical to the first SM identification number, the SM 210 may determine that the authentication unit 110 and the SM 210 share a same session key. When the decrypted second SM identification number is different from the first SM identification number, the SM 210 may determine that the authentication unit 110 and the SM 210 have different session keys.

In this instance, the SM 210 may decrypt any one of the encrypted third messages using the public key of the TA 300 based on the SSL scheme using the IV and the first session key received in the decrypted fifth message and sixth message.

Also, the SM 210 may configure status identification information including the session identification information and status information about whether the first session key is identical to the second session key.

In operation S311, the SM 210 may digitally sign the status identification information using the private key of the SM 210, encrypt the status identification information using the public key of the authentication unit 110, and transmit the encrypted status identification information to the authentication unit 110.

The authentication unit 110 may perform digital signature verification and decryption of the status identification information, and configure a seventh message when a message received with respect to the session identification information is successfully processed. The seventh message may include message process success information and installment operation control information which is required for installment and operation of the SM client. The message process success information may include an Internet Protocol (IP) address (DS_IP) of a server storing an SM client to be downloaded, a file name (FN), a transmission mechanism (TM) to download the SM client, and purchase request information (PurchaseReport_REQ) of an IPPV stored in the SM 210.

In operation S312, the authentication unit 110 may digitally sign the seventh message using the private key of the authentication unit 110, encrypt the digitally signed seventh message using the public key of the SM 210, and transmit the seventh message to the SM 210.

The SM 210 may receive an SM client image from a server using the IP address (DS_IP), the file name (FN), and the SM client transmission mechanism (TM) defined in the seventh message. The server may store the SM client image encrypted using a session key.

After processing the seventh message, the authentication unit 110 may digitally sign status information (Download_Status) associated with download and installment of the SM client image using the private key of the SM 210, encrypt the status information (Download_Status) using the public key of the authentication unit 110, and configure an eighth message including the status information (Download_Status).

In operation S313, the SM 210 may digitally sign the eighth message using the private key of the SM 210, encrypt the digitally signed eighth message using the public key of the authentication unit 110, and transmit the encrypted eighth message to the authentication unit 110.

In operation S314, the SM 210 may configure a ninth message using IPPV purchase information about the purchase request information (PurchaseReport_REQ), digitally sign the ninth message using the private key of the SM 210, encrypt the digitally signed ninth message using the public key of the authentication unit 110, and transmit the encrypted ninth message to the authentication unit 110.

As described above, a key for mutual authentication may be generated. A key generation method for mutual authentication is described in detail with reference to FIG. 5.

Figure 5:
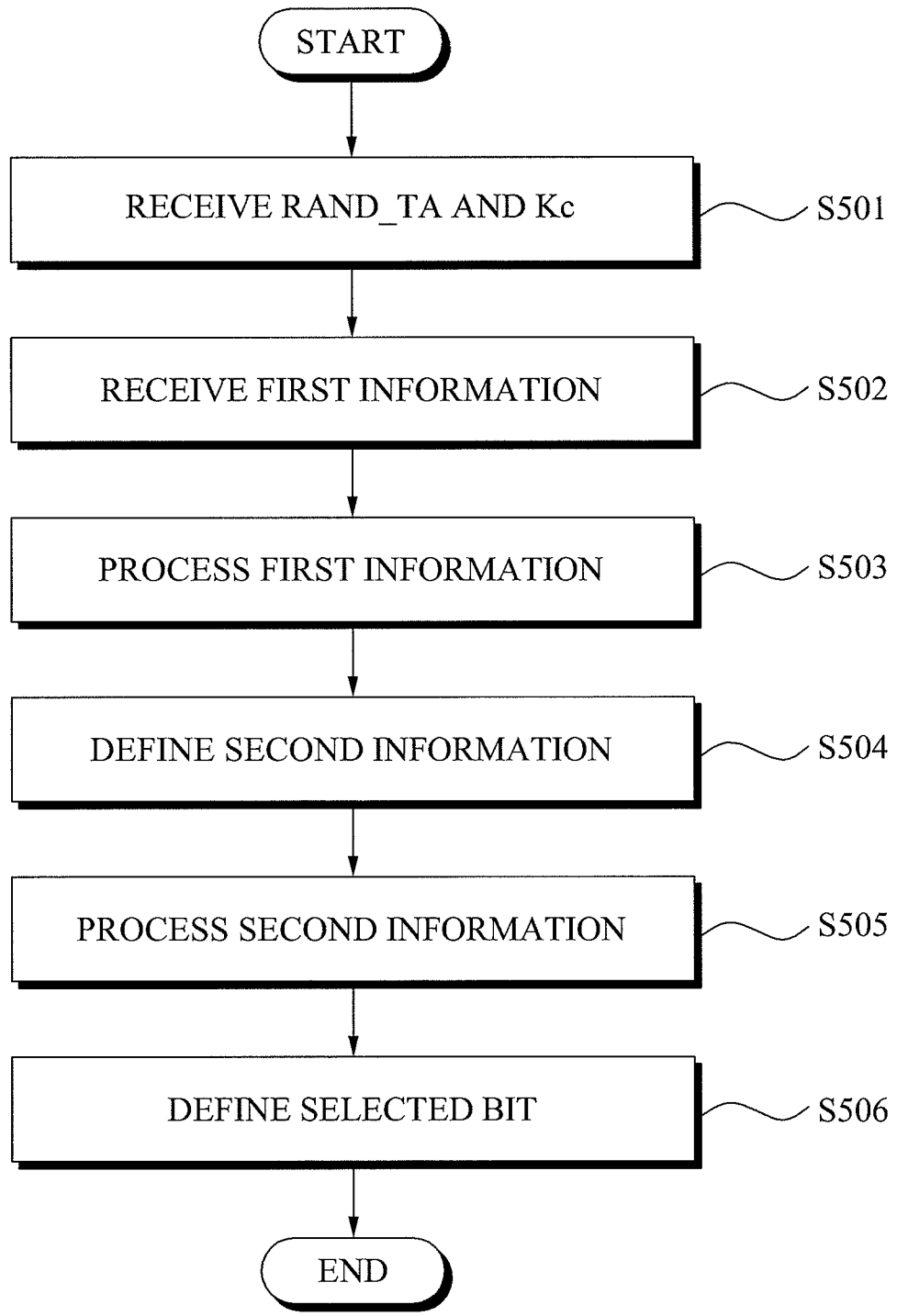
FIG. 5 is a flowchart illustrating a key generation method for mutual authentication according to an embodiment of the present invention.

FIG. 5 is a flowchart illustrating a key generation method for mutual authentication according to an embodiment of the present invention.

In operation S501, an authentication unit 110 may receive an initial key seed value (Kc) and a random value (RAND_TA) required for generation of a session key through a TA 300. The initial key seed value may be generated by inputting a secret key (pre-shared key) previously shared by an SM 210 and the TA 300.

In operation S502, the authentication unit 110 may receive first information including a unique number (SM_ID) of the SM 210 received from the SM 210, the initial key seed value (Kc), an SM identification number (NONCE_SM) (*the random value (RAND_TA) randomly generated by the SM 210, hardware version information of the SM 210, and software version information of the SM 210.

In operation S503, the authentication unit 110 may process the first information using a hash function.

In operation S504, the authentication unit 110 may define second information, processed by the hash function, as a master key.

In operation S505, the authentication unit 110 may process the second information using a random function.

In operation S506, the authentication unit 110 may select a predetermined bit from the second information, processed by the random function, and define the selected bit as the session key shared by the SM 210 and the authentication unit 110.

Similar to the authentication unit 110, the SM 210 may calculate the random value (RAND_TA) and the initial key seed value (Kc) generated by inputting a secret key (pre-shared key) previously shared with the TA 300. The random value (RAND_TA) may be generated by the authentication unit 110.

Also, the SM 210 may perform the hash function with respect to a unique number (SM_ID) of the SM 210, the initial key seed value (Kc), the random value (RAND_TA) randomly generated by the SM 210, hardware version information of the SM 210, and software version information of the SM 210 as an input value. Also, the SM 210 may define the information as a master key, perform the random function with respect to the information as an input value, and define the information as a session key shared by the SM 210 and the authentication unit 110.

According to an embodiment of the present invention, an authentication protocol may perform a variety of security functions such as a message authentication, a device authentication, and encryption or decryption of traffic data generated when a CAS software is transmitted in a DCAS.

Also, according to an embodiment of the present invention, a mutual authentication method may perform mutual authentication before a cable broadcasting provider downloads (or updates) a CAS software due to an error of the CAS software, version upgrade, and the like.

Also, according to an embodiment of the present invention, an information transmission method required to securely download a CAS software may be provided.

Also, according to an embodiment of the present invention, a message authentication, confidentiality of a transmitted/received message, mutual authentication between an authentication unit and a security module of a DCAS host, a key generation security, and the like may be guaranteed, and thus various security-related attacks may be prevented when a CAS software is downloaded, and a broadcasting service may be securely provided.

The mutual authentication method and key generation method for mutual authentication according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A mutual authentication apparatus in a Downloadable Conditional Access System (DCAS), the mutual authentication apparatus comprising:
    a computer system comprising a processor and memory;
    an authentication unit operating on the computer system and adapted to transmit an authentication session key to a security module (SM) through a Cable Modem Termination System (CMTS);
    a key management unit operating on the computer system and adapted to generate and manage the authentication session key; and
    a download unit operating on the computer system and adapted to at least one of control the SM to download and update a Conditional Access System (CAS) software,
    wherein security and authentication of information transmitting or receiving among a Trusted Authority (TA), the authentication unit, and the SM is configured to be performed according to a DCAS protocol,
    wherein the DCAS protocol is configured to perform mutual authentication between the authentication unit and the SM, wherein the performed mutual authentication is configure to be done prior to DCAS protocol enabling the CAS software to be transmitted to the SM, and wherein the performed mutual authentication by the DCAS protocol is configured to be performed without use of a Data Over Cable Service Interface Specification (DOCSIS) layer, an Internet Protocol (IP) layer, a Transmission Control Protocol/User Datagram Protocol (TCP/UDP) layer, and wherein the SM downloads the CAS software from the authentication unit and obtain an authority to a broadcasting signal.

2. The mutual authentication apparatus of claim 1, wherein a TA provides authentication-related information about authentication between the authentication unit and the SM.

3. The mutual authentication apparatus of claim 2, wherein the DCAS protocol defines a communication mechanism associated with a standard and a process of the information transmitting/receiving among the TA, the authentication unit, and the SM or any combination thereof.

4. The mutual authentication apparatus of claim 3, wherein the DCAS protocol is configured to operate independently of the Data Over Cable Service Interface Specification (DOCSIS) layer, the Internet Protocol (IP) layer, the Transmission Control Protocol/User Datagram Protocol (TCP/UDP) layer.

5. A mutual authentication method in a Downloadable Conditional Access System (DCAS), the mutual authentication method comprising:

receiving authentication-related information about authentication between an authentication unit and a security module (SM) from a Trusted Authority (TA);

generating an authentication session key using the authentication-related information;

transmitting the authentication session key by the authentication unit to the SM through a Cable Modem Termination System (CMTS); and controlling a CAS software to be downloaded to the SM from the authentication unit, when the authentication is completed by the authentication session key, and generating the authentication session key from a DCAS protocol, and operating the DCAS protocol independently of a Data Over Cable Service Interface Specification (DOCSIS) layer, an Internet Protocol (IP) layer, a Transmission Control Protocol/User Datagram Protocol (TCP/UDP) layer, and wherein the SM obtains an authority to a broadcasting signal.

6. A mutual authentication apparatus in a Downloadable Conditional Access System (DCAS), the mutual authentication apparatus comprising:

a computer system comprising a processor and memory;

an authentication unit operating on the computer system and adapted to transmit an authentication session key to a security module (SM) through a Cable Modem Termination System (CMTS);

a key management unit operating on the computer system and adapted to generate and manage the authentication session key; and a download unit operating on the computer system and adapted to control the SM to download or update a Conditional Access System (CAS) software, wherein security and authentication of information transmitting or receiving among a Trusted Authority (TA), the authentication unit, and the SM is configured to be performed according to a DCAS protocol, wherein the DCAS protocol is a protocol that is mutually exclusive from a Data Over Cable Service Interface Specification (DOCSIS) layer, an Internet Protocol (IP) layer, a Transmission Control Protocol/User Datagram Protocol (TCP/UDP) layer, and wherein the SM obtains an authority to a broadcasting signal.

* * * * *